F. SPRANGER.
HUB CONSTRUCTION.
APPLICATION FILED DEC. 17, 1917.
1,306,503.
Patented June 10, 1919.
2 SHEETS—SHEET 2.
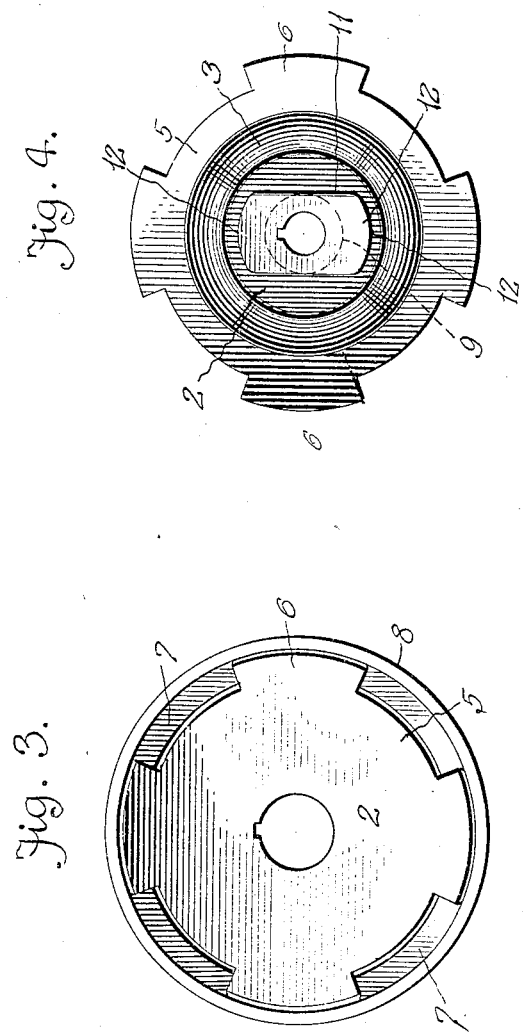
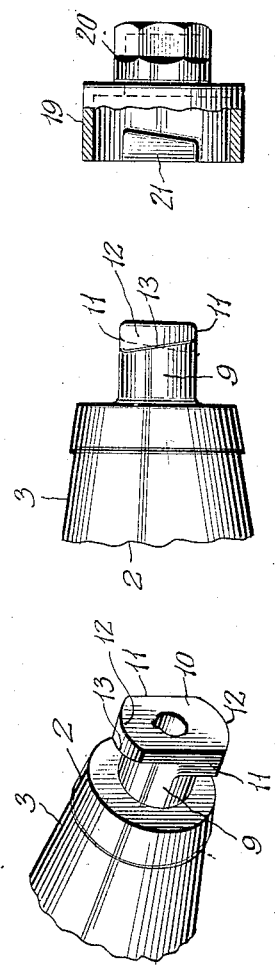

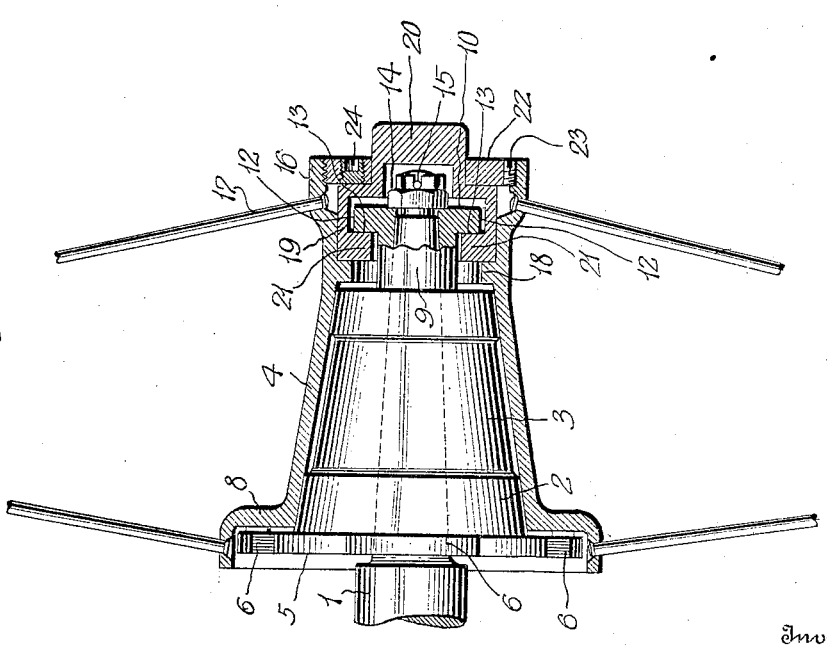

UNITED STATES PATENT OFFICE.

FRANK SPRANGER, OF DETROIT, MICHIGAN, ASSIGNOR TO SPRANGER WIRE WHEEL COMPANY, OF DETROIT, MICHIGAN, A CORPORATION OF MICHIGAN.

HUB CONSTRUCTION.

1,306,503.      Specification of Letters Patent.      Patented June 10, 1919.

Application filed December 17, 1917. Serial No. 207,469.

*To all whom it may concern:*

Be it known that I, FRANK SPRANGER, a citizen of the United States of America, residing at Detroit, in the county of Wayne and State of Michigan, have invented certain new and useful Improvements in Hub Constructions, of which the following is a specification, reference being had therein to the accompanying drawings.

This invention relates to a hub construction for a demountable wheel, and has special reference to an automobile wheel that may have wire or wooden spokes with any type of rim and tire.

My invention aims to provide inner and outer hub members for a wheel with novel means at the inner ends of the hub members for establishing a driving relation therebetween and at the outer ends of the hub members there are novel means for maintaining the outer hub members on the inner hub members, so that the former cannot slip relatively to the latter, become accidentally displaced, or destroy the driving relation between the outer and inner hub members.

My invention further aims to provide a novel cap for inclosing the outer ends of an axle or knuckle spindle, and the cap is provided with wedging portions that may be interposed between parts of the inner and outer hub members so as to bring these members into snug engagement. Associated with the cap is a retaining ring which coöperates therewith in providing a closure for the outer end of the outer hub member.

My invention will be hereinafter specifically described and then claimed, and reference will now be had to the drawing, wherein—

Figure 1 is a longitudinal sectional view of a hub construction, showing an inner hub member partly in elevation;

Fig. 2 is a view of the outer end of the hub construction;

Fig. 3 is a view of the inner end of the hub construction;

Fig. 4 is an end view of the inner hub member;

Fig. 5 is a perspective view of the outer end of the inner hub member;

Fig. 6 is a plan of the same;

Fig. 7 is a side elevation of a detached cap, partly broken away and partly in section.

To put my invention into practice, I provide the spindle 1 of an axle or knuckle with a tapering inner hub member 2 and the outer wall of said inner member has an annular groove or channel 3, which provides clearance for a lubricant and at the same time permits of the ends of the inner hub member serving as bearing surfaces for a hollow tapering outer hub member 4.

The inner end of the inner hub member 2 has a peripheral flange 5, as best shown in Fig. 4, and this flange is formed with equally spaced segment shaped lugs 6 adapted to engage between the projecting segment shaped lugs 7 within the enlarged inner end or bell portion 8 of the outer hub member 4.

The lugs 6 and 7, when properly meshed or interlocked are adapted to establish a driving relation between the inner and outer members.

The outer end of the inner hub member 2 has a neck portion 9 provided with a transverse head 10, and said head has opposed flat walls 11 and opposed curved walls 12, the curved walls having their arcs described from a center in the longitudinal axis of the inner hub member. The flat walls 11 merge into the cylindrical wall of the neck portion 9 and the inner wall of the head 10, which projects from the neck portion 9 of the inner hub member, is beveled, as at 13, in opposite directions, as best shown in Fig. 6, and the construction of the head 10 is such as to provide two lugs projecting from opposite sides of the neck portion 9, with the wall of each lug beveled.

The spindle 1 extends into the neck portion 9 of the inner hub member 2 and the usual reduced and exteriorly screw-threaded end of the spindle protrudes from the head 10 to receive a castellated nut 14 and a cotter pin 15. In some instances, the hub member 2 may be keyed on the spindle 1 for rotation therewith in other instances, antifrictional bearings may be interposed between the inner hub member 2 and the spindle 1 so that the inner hub member 2 may freely rotate about the spindle.

The outer end of the outer hub member 4 is flared or enlarged, as at 16, and the wire spokes 17 may be connected to the inner and outer ends of the outer hub member.

Continuous to the outer flared end of the outer hub member is an annular interior shoulder 18 surrounding the neck portion 9 of the inner hub member 2.

Engaging the annular shoulder 18 is the inner end of a cylindrical cap 19 having a portion 20 which is also hollow to provide clearance for the nut 14 and spindle 1. The cap 19 is adapted to inclose the head 10 and the inner wall of said cap has diametrically opposed beveled lugs 21. The inwardly projecting lugs 21 of the cap 19 are adapted to engage the beveled walls of the head 10, and as the lugs 21 engage the head 10 the cap is forced inwardly. Since the cap abuts the shoulder 18 the outer hub member 4 will be forced on to the inner hub member, and it is in consequence of the portions of the cap interposed between the head 10 and the shoulder 18 that causes the inner and outer hub members to become locked or wedged against longitudinal movement relative to each other.

A portion of the nut 20 of the cap 19 is cylindrical so as to receive a retaining ring 22 which is screwed into the outer flared end 16 of the outer hub member 4 and held against accidental displacement by a small locking screw 23. The ring 22 is also provided with a screw 24 that engages the outer end of the cap 19 and prevents said cap from shifting after having been turned into frictional engagement with the head 10 of the shoulder 18, and a spanner wrench or other tool may be used in recesses 25 of the ring 22 for rotating the ring.

By loosening the screw 24, the cap 19 may be partially rotated so as to move the lugs 21 of the cap out of engagement with the head 10 of the inner hub member, and then the outer hub member 4 may be bodily withdrawn from the inner hub member.

What I claim is:—

1. In a hub construction, the combination of an inner hub member, a cross head at the outer end thereof, said cross head having its inner face at the ends thereof beveled in opposite directions, an outer hub member on said inner hub member provided with an annular interior shoulder adjacent the head of the inner hub member, a retaining ring in the outer end of said outer hub member, a cap rotatable between said ring and the shoulder of said outer hub member and having a nut portion protruding through said ring, beveled lugs in said cap and adapted to engage behind the beveled ends of said head to hold said outer hub member on said inner hub member, and means at the inner ends of said hub members establishing a driving relation therebetween.

2. In a hub construction, the combination of an inner hub member, a cross head at the outer end thereof, an outer hub member on said inner hub member provided with an annular shoulder adjacent said head, a detachable retaining ring locked in said outer hub member, a cap between said retaining ring and the shoulder of said outer hub member adapted to engage behind said head and hold said outer hub member on said inner hub member, a nut portion carried by said cap and extending through said retaining ring, means carried by said retaining ring adapted to hold said cap in an adjusted position, and means at the inner ends of said hub members adapted to establish a driving connection therebetween.

In testimony whereof I affix my signature in the presence of two witnesses.

FRANK SPRANGER.

Witnesses:
ANNA M. DORR,
KARL H. BUTLER.